United States Patent [19]

Verschuren et al.

[11] Patent Number: 5,468,512
[45] Date of Patent: Nov. 21, 1995

[54] FAT-REPLACING INGREDIENT AND METHOD OF MAKING

[75] Inventors: Jozephus J. Verschuren, Poortugaal; Wilhelmus A. M. Castenmiller, Vlaardingen; Ivo A. van Amerongen, Rotterdam; Loillbrord C. van Der Meijs, Vlaardingen, all of Netherlands

[73] Assignee: Van den Bergh Foods Company, Division of Conopco, Inc., Lisle, Ill.

[21] Appl. No.: 179,392

[22] Filed: Jan. 10, 1994

[30] Foreign Application Priority Data

Jan. 13, 1993 [EP] European Pat. Off. .............. 93200077

[51] Int. Cl.$^6$ ....................................................... A23L 1/09
[52] U.S. Cl. ........................... 426/658; 426/521; 426/580; 426/583; 426/585; 426/589
[58] Field of Search ..................................... 426/521, 580, 426/583, 585, 589, 658

[56] References Cited

U.S. PATENT DOCUMENTS

| 3,397,994 | 8/1968 | Elenbogen et al. . |
| 4,769,255 | 9/1988 | Ahmed et al. . |
| 5,294,455 | 3/1994 | O'Brien ................................. 426/583 |

FOREIGN PATENT DOCUMENTS

| 0396170 | 7/1990 | European Pat. Off. . |
| 3280857 | 12/1991 | Japan . |
| 3280856 | 12/1991 | Japan . |
| 4210578 | 7/1992 | Japan . |
| 4299957 | 10/1992 | Japan . |
| WO91/03165 | 3/1991 | WIPO . |
| WO91/13076 | 7/1991 | WIPO . |

OTHER PUBLICATIONS

Arbuckle, "Ice Cream," 4th ed. (1986), published by AVI, Westport, Conn., pp. 204–206 and 224.
Voedingsmiddelen Technologie, No. 1992, Teeuwen et al., "Inuline: een natuurlijke voedingsvezel herontdekt" Nov. 25, 1992, No. 24.

Primary Examiner—Helen Pratt
Attorney, Agent, or Firm—Gerard J. McGowan, Jr.

[57] ABSTRACT

A method for the pasteurization of oligofructoses, in which they are heated at a temperature from 72° to 82° C. for 10 to 300 s. Preferably the pasteurized oligofructose are used in spreads, dressings, cheese, dairy and non-dairy creams, toppings, processed cheese, pâtés, semi-hard cheese, sauces, sweet spreads, pastry-margarines or ice cream

10 Claims, 1 Drawing Sheet

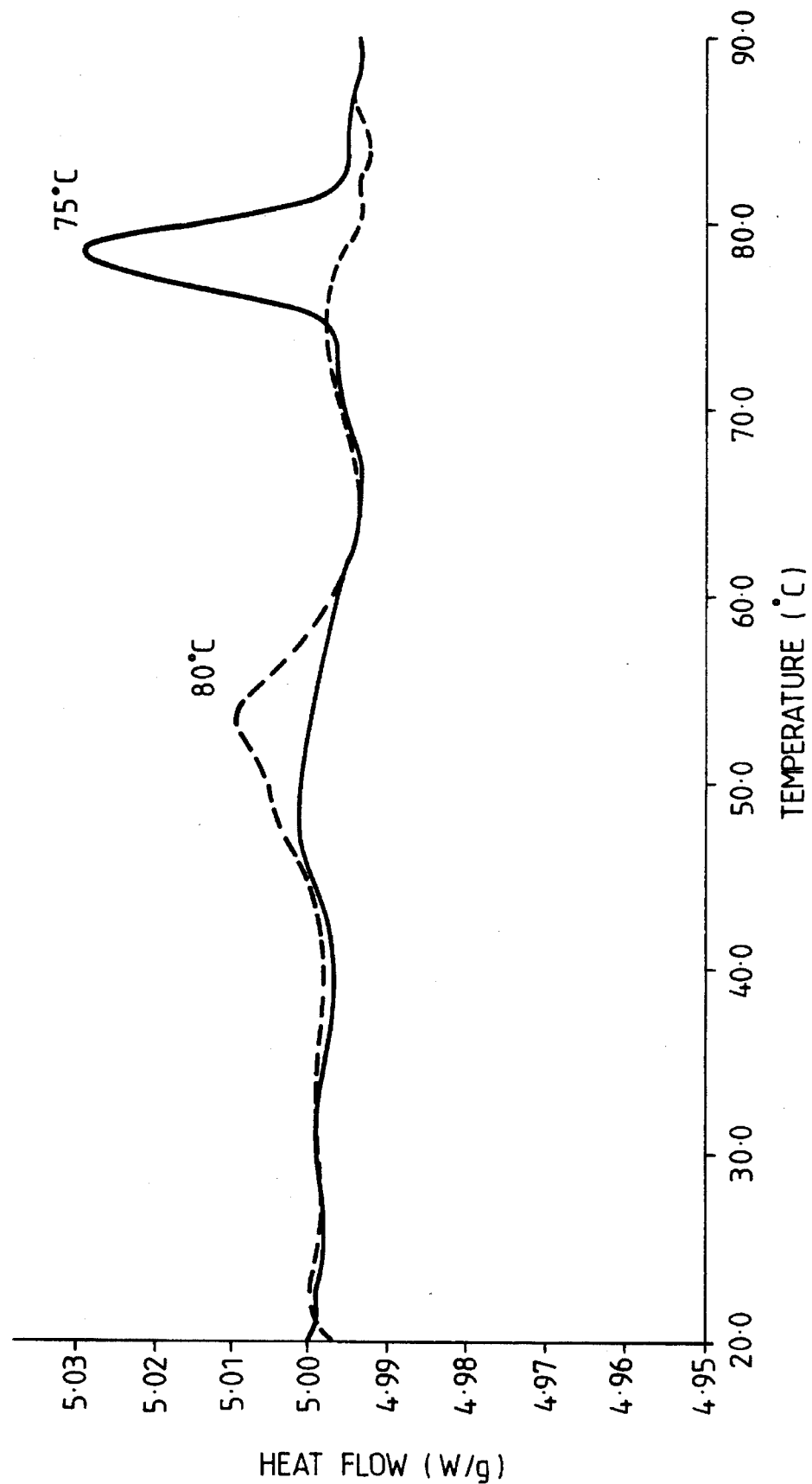

FAT-REPLACING INGREDIENT AND METHOD OF MAKING

The present invention relates to fat-replacement ingredients, in particular to the pasteurisation of fat-replacing ingredients. Also the invention relates to products containing these pasteurised ingredients.

Over the last decade many non-triglyceride substances have been described as potential fat-replacers in food products. Examples thereof are waxes, e.g. jojoba oil and hydrogenated jojoba oil, polysiloxanes, acylated glycerides, polyalkoxyglycerolethers, dicarboxylic acid esters, polyol fatty acid polyesters and the epoxy extended derivatives thereof. Examples of disclosures of fat-replacers are e.g. U.S. Pat. No. 3,600,186, U.S. Pat. No. 4,005,195 and U.S. Pat. No. 4,005,196.

In particular effort has been directed towards the development of fat-replacement compositions which possess a smooth and oily taste, texture, mouthfeel and lubricity without resulting in an off-taste or malodour.

JP 267450/90 (Ajinimoto Co. Ltd.) discloses the use of polyfructan as a fat or oil substitute in food products. Preferred polyfructans are low caloric polysaccharides of the inulin type, which are mainly composed of beta-2,1-bonds.

A problem with the use of oligofructose materials is that often they are not ambient stable and hence they need pasteurisation to extend their shelflife. However, often the pasteurisation conditions are detrimental to the quality of the product.

Surprisingly it has now been found that if specific pasteurisation conditions are applied, products of satisfactory quality can be obtained.

In particular it has been found that if relatively mild pasteurization conditions are applied this leads to a good quality product. Also it has been found that the presence of a main DSC peak having an onset temperature of more than 70° C. is characteristic for oligofructoses which have been pasteurised under the appropriate conditions.

Accordingly a first embodiment of the invention relates to a pasteurised oligofructose having a main DSC peak which has an onset temperature of more than 70° C., preferably between 74° C. and 85° C.

For the purpose of the invention the DSC spectrum can be determined by using a Perkin-Elmer 7 series Thermal analysis system operated between 15° C. and 90° C. at a temperature increase rate of 5° C./minute while measuring the Heat flow (W/g). The onset temperature of a peak can be measured by determining the temperature at the intersect of the base-line (heat flow without peaks in the spectrum) and the tangent of the peak at its steepest point.

If the pasteurised oligofructose is present in a food product the food product as such may be subjected to DSC. If more appropriate the food product may be diluted e.g. with water to facilitate the measurements. If the oligofructose per se is to be tested, then conveniently the DSC measurements are done on aqueous solutions or suspensions of the oligofructose e.g. at a concentration of 20 to 40 wt %.

The pasteurized nature of the oligofructose can be determined by any suitable technique. For example the amount of microorganisms in the product can be determined or the ambient stability can be tested or the outgrowth of microorganisims after adding a (pasteurized medium) can be monitored.

It has been found that the specific suitable pasteurization conditions for oligofructoses may depend on the type of oligofructoses to be pasteurized and the presence of other ingredients. Many oligofructoses, however can suitably be pasteurized at a temperature of 72° to 82° C. for 6 to 300 seconds.

Accordingly in a second aspect the invention relates to a method for the pasteurisation of oligofructoses, comprising the heating at a temperature from 72° to 82° C. for 6 to 300 s.

Preferably the pasteurisation takes place at a temperature of 74° to 76° C., most preferred about 75° C. The period of heating is preferably from 8 to 250 s, more preferred 10 to 200 s. Preferably, nowhere in the process for pasteurisation (or food preparation) the temperature of the oligofructose exceeds 85° C., in some embodiments it is even preferred that the temperature does not exceed 80° C. or even 78° C.

The present invention is preferably used for the pasteurisation of an aqueous paste comprising 10 to 50 percent by weight calculated on the total composition of an oligofructose and 40 to 90 wt % of water. Preferably the amount of oligofructose is from 20 to 45, more preferably from 30 to 40 percent by weight.

BRIEF DESCRIPTION OF THE DRAWING

FIG. 1 shows the DSC spectrum for a paste in accordance with the invention and for a comparison, as described in Example II.

The oligofructose employed may not only contain fructose units in the chain and as terminal group, but also minor amounts of other monosaccharide units such as those e.g. derived from glucose. Also the oligofructose is preferably of the beta-2,1 type, more specifically it is inulin which may be obtained from plants such as e.g. Compositae species and fructans obtained from various micro-organisms as e.g. *Aspergillus sydowii*. Other suitable oligofructoses are e.g. irisin and lycorisin. Preferably the oligofructose employed contains on average 5–200 fructose units, more preferably 8–70 fructose units e.g. 10 to 30 and less than 10, more preferably less than 5% w.w. of mono- and disaccharides. Although a minor amount of chain branching in the oligofructose does not seem to affect performance it is preferred that the oligofructose employed is substantially linear.

If a paste is used, the particle size of the oligofructose agglomerates in the paste should preferably be in the order of magnitude of 0.5–20, preferably 1–5 micrometer which can be effected by suitable processing. The size of the primary oligofructose particles preferably is in the order of magnitude of 50 to 500 nm.

Preferably the Stevens value of the paste after pasteurisation is more than 50 g at 5° C., more preferably more than 65 g, most preferable more than 70 or 100 g. Generally the Stevens value is less than 700 g, more general less than 600 g. The Stevens value may be obtained by analyzing samples with a Stevens LFRA Structure Analyzer (ex C. Stevens & Son Weighing Machines Ltd, London EC 1 V 7 LD, U.K.) and using a 4.4 mm probe. Similar preferred Stevens values apply to the food products containing the pasteurised oligofructoses according to the invention.

Preferably the pasteurisation of the oligofructose material is followed by a cooling step. Preferred cooling conditions involve a reduction of the temperature to 20° C. or lower in a time period of 1 to 600 s. Preferably the cooling takes place under shear for example at 200–2000 rpm in an A-unit.

Pasteurised oligofructoses in accordance to the invention may suitably be used in food products. Examples of foodstuffs in which the pasteurised oligofructoses may be used, are spreads, in particular zero- or extremely low fat spreads (which contain less than about 20% of fat), dressings, i.e.

spoonable or pourable dressings e.g. dressings of the mayonnaise-type, dairy and non-dairy creams, toppings, processed cheese, pâtés, semi-hard cheese, sauces, sweet spreads, pastry-margarines, ice cream. Preferred food products are ready to eat food products. Also preferred are food products packed in portions of 1–5000 g, for example 10–1000 g, for example in tubs, bottles, wrappers, boxes etc. The level of pasteurised oligofructoses in food products is preferably from 0.1 to 50 wt %, more preferred 10 to 45 wt %, most preferred 15 to 40 wt %.

The pasteurisation of the oligofructoses may be done before addition of the other ingredients of the compositions, but equally possible is that the pasteurisation takes place in the presence of one or more of the remaining ingredients of the product.

In a preferred embodiment of the invention, the pasteurised oligofructoses are used in food products containing biopolymer materials. Suitable biopolymer materials (excluding oligofructoses as defined above) are for example other carbohydrates (for example starches or gums) and proteins, some of which are more fully disclosed in EP-A-237 120, which is hereby incorporated by reference. Examples of such very suitable biopolymer materials are, gelatin, soy protein, milk protein, xanthan gum, carrageen, pectin, locust bean gum, (modified) starches (for example Paselli SA2, a modified starch ex AVEBE and N-oil) and microcrystalline cellulose.

The amount of biopolymer in compositions of the invention is dependent on the desired degree of thickening or gelling and the presence of other ingredients in the composition. Usually the amount of biopolymer lies between 0.05 and 30%, mostly between 0.1 and 25% based on the weight of the product. If modified starch is present as the sole biopolymer material, the level is preferably from 5–20%, if used in combination with other biopolymer material their level is preferably lower, for example 0.5 to 10 wt %. If other carbohydrates, for example gums are used, their level if preferably from 0.05 to 5 wt %. If gelling proteins, preferably gelatin, are used, their level is preferably from 0.5 to 10 wt %.

Preferably, food products containing the pasteurised oligofructose according to the invention comprise generally less than 20 wt % of fat, more preferred from 0 to 10%, most preferred these food products are substantially free from fat or contain very low levels of fat (say from 0.01 to 2 wt %). Suitable edible triglyceride materials are for example disclosed in Bailey's Industrial Oil and Fat Products, 1979. The use of highly unsaturated oils such as sunflower oil, soy bean oil or corn oil without added "hardstock" is preferred. For the purpose of the invention the term fat also includes other, especially non-digestible, fatty materials, for example sucrose fatty acid polyesters, which may be used as a replacement for part or all of the triglyceride material.

Food products in accordance with the invention may optionally further comprise any of the conventional food ingredients such as salt, sugar or sweetening agents, acids, spices, bulking agents, flavouring materials, colouring materials, preserving agents and vegetable particles etc.

Generally the balance of compositions of the invention will be water. The level of water may be from 30 to 90 wt %, but generally the level will be more than 50 wt %, more preferred more than 60 wt %.

Food products according to the present invention may have improved rheological properties and at least one of the less favourable tendencies mentioned above is improved, in particular the tendency of losing structure upon shearing.

These advantages are particularly apparent when relatively high levels of oligofructose are used (say 10 to 60 wt % based on the food product); more preferably these levels are used in combination with biopolymer materials.

The invention is illustrated by the following examples. In the examples unless specified otherwise, all percentages and parts are based on weight.

EXAMPLE 1

A fat free spread was prepared from the following ingredients:

36.0 parts inulin (Raftiline LS containing mainly 10–60 fructose units)

1.5 parts NaCl 0.12 parts potassium sorbate 0.05 parts β-carotene (1% water soluble solution) up to 100 parts water All the ingredients were mixed together with the exception of inulin and then added to cold water. When the ingredients were completely dissolved the inulin was added slowly to the solution. The suspension was then mixed for 5 minutes with a high energy mixer [Ultra turrax (trade name) type TP 18/10]. During the mixing the pH was adjusted to 4.7 by adding a small amount of lactic acid.

The mixture thus obtained was pasteurised for 130 s at 75° C. and subsequently cooled to 5° C. in an A-unit.

The mixture so obtained was filled in tubs, which were immediately stored in a refrigerator at 5° C. After one week storing the product was tested and showed a smooth texture and a very acceptable mouthfeel. The Stevens value of the product was determined and found to be 80 g.

As a comparison, the same procedure was followed except that the product was pasteurised at 80° C. A product was obtained having an unacceptable spread structure and a Stevens value of 35 g.

EXAMPLE II

A aqueous paste was prepared containing 35 wt % of Fibruline Instant ex Cosucra. The preparation of the paste involved the dispersing of the oligofructose at 60° C. for 15 minutes followed by a period of 60 minutes to dissolve the material completely. The pH is adjusted to 4.9 using a 20% lactic acid solution. The paste is mixed for another 30 minutes.

The oligofructose was pasteurized at 75° C. for 30 s. As a comparison the oligofructose was pasteurized at 80° C. for 30 s. The DSC spectrum of the paste was determined using a Perkin-Elmer 7 series Thermal analysis system operated at 5° C./min. The resulting spectrum is represented in FIG. 1. The oligofructose pasteurized at 75° C. showed a main peak in the spectrum, said peak having an onset of 75° C. and a maximum peak height at 78° C. The spectrum of the paste pasteurized at 80° C. did not show this main peak.

The oligofructoses as pasteurized at 75° C. could suitably be applied in spreads providing products of a suitable hardness. The comparative oligofructoses pasteurized at 80° C. resulted in spread products which were to soft.

EXAMPLE III

Example II was repeated with the following modifications: Raftiline LS was used as the oligofructose material and the pasteurization temperatures were 80° C. and 85° C. (comparison).

The DSC spectrum of the oligofructose pasteurized at 80° C. showed a main peak having an onset of 77° C. and a maximum at 80° C. This peak was no longer present in the paste which was pasteurized at 85° C.

Suitably spreads could be prepared with the oligofructose pasteurized at 80° C. The oligofructose pasteurized at 85° C. resulted in too soft spreads.

We claim:

1. A pasteurised oligofructose having a main DSC peak which has an onset temperature of more than 70° C.

2. The pasteurized oligofructose according to claim 1 having an onset temperature between 74° C. and 85° C.

3. A method for preparing pasteurised oligofructoses having a main DSC peak which has an onset temperature of more than 70° C., comprising pasteurizing by heating at a temperature from 72° to 82° C., for 6 to 300 s.

4. A method in accordance to claim 3, comprising the heating to 74° to 76° C. for 10 to 250 s.

5. A method in accordance to claim 3, wherein the oligofructoses are pasteurized as an aqueous paste, comprising from 10 to 50 wt. % oligofructoses and 40 to 90 wt. % of water.

6. A method in accordance to claim 3, wherein the pasteurised oligofructoses are cooled to a temperature of 20° C. or lower in an A-unit.

7. The method according to claim 3 comprising heating at a temperature from 72° to 78° C.

8. A food product selected from the group consisting of spreads, dressings, cheese, dairy and non-dairy creams, toppings, processed cheese, pâtés, semi-hard cheese, sauces, sweet spreads, pastry-margarines and ice cream, comprising a pasteurised oligofructose according to claim 1.

9. A food product according to claim 6 having a Stevens value of more than 50 g.

10. The food product according to claim 9 having a Stevens value of more than 120 g.

\* \* \* \* \*